US007020878B1

(12) United States Patent
Rhee et al.

(10) Patent No.: US 7,020,878 B1
(45) Date of Patent: *Mar. 28, 2006

(54) SYSTEM FOR ALLOCATING RESOURCE USING THE WEIGHT THAT REPRESENTS A LIMITATION ON NUMBER OF ALLOWANCE ACTIVE SESSIONS ASSOCIATED WITH EACH RESOURCE CONSUMER GROUP

(75) Inventors: Ann Rhee, Foster City, CA (US); Sumanta Chatterjee, Fremont, CA (US); Juan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 727 days.

This patent is subject to a terminal disclaimer.

(21) Appl. No.: 09/967,459

(22) Filed: Sep. 27, 2001

Related U.S. Application Data

(63) Continuation-in-part of application No. 09/141,664, filed on Aug. 28, 1998, now Pat. No. 6,341,303, and a continuation-in-part of application No. 09/141,666, filed on Aug. 28, 1998, now Pat. No. 6,457,008.

(51) Int. Cl.
*G06F 9/46* (2006.01)

(52) U.S. Cl. ...................... 718/104; 718/100; 718/102; 718/103

(58) Field of Classification Search ................ 718/100, 718/102, 103, 104, 105, 107
See application file for complete search history.

(56) References Cited

U.S. PATENT DOCUMENTS

| 4,283,711 A | 8/1981 | Chang |
| 5,010,482 A * | 4/1991 | Keller et al. ................ 710/52 |
| 5,325,525 A | 6/1994 | Shan et al. |
| 5,355,475 A | 10/1994 | Tanaka et al. |

(Continued)

OTHER PUBLICATIONS

Logan G. Harbaugh, *Balancing The Load*, Tech/Web, Jan. 25, 1999, pp. 1–14 .internetweek.com/reviews/rev012599.htm.

(Continued)

*Primary Examiner*—Meng-Al T. An
*Assistant Examiner*—Lilian Vo
(74) *Attorney, Agent, or Firm*—Bingham McCutchen LLP

(57) ABSTRACT

One embodiment of the present invention provides a resource scheduler for allocating a computer system resource, such as memory or mass storage, within a processor, to database management system (DBMS) processes. The resource scheduler operates according to resource plans and resource allocation methods. One or more plans may be configured and loaded with the DBMS. Each plan allocates the resource according to an associated resource allocation method. During operation of the DBMS, any or all of the active plans and resource allocation methods may be exchanged for alternate plans or resource allocation methods. In one embodiment of the invention the resource scheduler enforces a maximum active sessions resource allocation method in which system resources are allocated by limiting the number of active sessions allowed in groups of database processes grouped according to common execution requirements. A selected plan includes multiple process groups and/or sub-plans. The resource scheduler allocates system resources among the sub-plans and groups of database processes according to their associated limits on active session numbers, with sub-plans and groups having higher active session limits getting access to more system resources than sub-plans and groups having lower active session limits.

44 Claims, 10 Drawing Sheets

| | LEVEL 1 552 | LEVEL 2 554 | LEVEL 3 556 |
|---|---|---|---|
| ON-LINE CONSUMERS 560 | 60% | 50% | 0% |
| BATCH CONSUMERS 562 | 20% | 0% | 100% |
| DBMS MAINTENANCE 564 | 0% | 50% | 0% |

DATABASE PLAN 550

U.S. PATENT DOCUMENTS

| | | | |
|---|---|---|---|
| 5,392,430 A | 2/1995 | Chen et al. | |
| 5,452,452 A | 9/1995 | Gaetner et al. | |
| 5,515,538 A | 5/1996 | Kleiman | |
| 5,566,349 A | 10/1996 | Trout | |
| 5,623,647 A | 4/1997 | Maitra | |
| 5,815,689 A | 9/1998 | Shaw et al. | |
| 5,828,568 A | 10/1998 | Sunakawa et al. | |
| 5,842,226 A | 11/1998 | Barton et al. | |
| 5,884,077 A | 3/1999 | Suzuki | |
| 6,003,061 A * | 12/1999 | Jones et al. | 718/104 |
| 6,021,508 A | 2/2000 | Schmuck et al. | |
| 6,085,216 A * | 7/2000 | Huberman et al. | 718/104 |
| 6,085,218 A | 7/2000 | Carmon | |
| 6,085,333 A | 7/2000 | DeKoning et al. | |
| 6,105,053 A * | 8/2000 | Kimmel et al. | 718/105 |
| 6,160,798 A * | 12/2000 | Reed et al. | 370/331 |
| 6,182,133 B1 | 1/2001 | Horvitz | |
| 6,223,201 B1 * | 4/2001 | Reznak | 718/102 |
| 6,223,206 B1 | 4/2001 | Reznek | |
| 6,263,298 B1 | 7/2001 | Kerman et al. | |
| 6,263,358 B1 | 7/2001 | Lee et al. | |
| 6,263,359 B1 | 7/2001 | Fong et al. | |
| 6,341,303 B1 * | 1/2002 | Rhee et al. | 718/104 |
| 6,353,844 B1 * | 3/2002 | Bitar et al. | 718/102 |
| 6,366,915 B1 | 4/2002 | Rubert et al. | |
| 6,366,945 B1 * | 4/2002 | Fong et al. | 718/104 |
| 6,385,637 B1 | 5/2002 | Peters et al. | |
| 6,385,638 B1 * | 5/2002 | Baker-Harvey | 718/107 |
| 6,415,190 B1 | 7/2002 | Colas et al. | |
| 6,415,384 B1 | 7/2002 | Dave | |
| 6,430,594 B1 | 8/2002 | Akiyama et al. | |
| 6,438,704 B1 | 8/2002 | Harris et al. | |
| 6,463,457 B1 | 10/2002 | Armentrout et al. | |
| 6,496,848 B1 | 12/2002 | Nankaku | |
| 6,550,042 B1 | 4/2003 | Dave | |
| 6,563,793 B1 | 5/2003 | Golden et al. | |
| 6,581,055 B1 | 6/2003 | Ziauddin et al. | |
| 6,600,963 B1 | 7/2003 | Loise et al. | |
| 6,601,035 B1 | 7/2003 | Panagos et al. | |
| 6,643,367 B1 * | 11/2003 | White-Hauser | 379/269 |
| 6,667,988 B1 * | 12/2003 | Liu et al. | 370/463 |
| 6,714,960 B1 | 3/2004 | Bitar et al. | |
| 6,779,182 B1 * | 8/2004 | Zolnowsky | 718/103 |
| 6,792,445 B1 | 9/2004 | Jones et al. | |
| 2002/0019879 A1 | 2/2002 | Jasen et al. | |
| 2003/0021228 A1 | 1/2003 | Nakano et al. | |
| 2003/0028852 A1 | 2/2003 | Thurman et al. | |
| 2003/0120871 A1 | 6/2003 | Ayaki et al. | |
| 2003/0200252 A1 | 10/2003 | Krum | |
| 2004/0039935 A1 | 2/2004 | Plsecky | |
| 2004/0073603 A1 | 4/2004 | Ellis, III | |
| 2004/0073735 A1 | 4/2004 | Boom et al. | |

OTHER PUBLICATIONS

Sitara Networks; QoS Glossory, Jul. 2, 2001, pp. 1-18, sitaranetworks.com/what_is_qos_glossary.cfm.

* cited by examiner

|  | LEVEL 1 552 | LEVEL 2 554 | LEVEL 3 556 |
|---|---|---|---|
| ON-LINE CONSUMERS 560 | 60% | 50% | 0% |
| BATCH CONSUMERS 562 | 20% | 0% | 100% |
| DBMS MAINTENANCE 564 | 0% | 50% | 0% |

DATABASE PLAN 550

FIG. 4C

SYSTEM FOR ALLOCATING RESOURCE USING THE WEIGHT THAT REPRESENTS A LIMITATION ON NUMBER OF ALLOWANCE ACTIVE SESSIONS ASSOCIATED WITH EACH RESOURCE CONSUMER GROUP

RELATED APPLICATION INFORMATION

This application is a continuation in part and claims the benefit of U.S. patent application Ser. No. 09/141,664 filed Aug. 28, 1998 now U.S. Pat. No. 6,341,303, entitled "Pluggable Resource Scheduling Policies" and naming Ann Rhee, Sumanta K. Chatterjee, Juan R. Loaiza and Kesavan Srinivasan as inventors, which application is incorporated herein by reference, in its entirety. This application is a continuation in part and claims the benefit of U.S. patent application Ser. No. 09/141,666 filed Aug. 28, 1998 now U.S. Pat. No. 6,457,008, entitled "Resource Scheduler" and naming Ann Rhee, Sumanta K. Chatterjee, Juan R. Loaiza and Kesavan Srinivasan as inventors, which application is incorporated herein by reference, in its entirety.

BACKGROUND

1. Field of the Invention

The present invention relates to computer operating systems. More specifically, the invention relates to a method of scheduling the use of a computer system resource according to a non-preemptive and dynamically selectable allocation scheme.

2. Related Art

Today's computer systems are relied upon to perform a variety of operations. Performance of the requested operations requires the use of various system resources (e.g., processor, memory, mass storage, network access). The busier the system (i.e., the more users connected to the system and the more processes or jobs running on the system), the greater the demand upon each such resource. Whenever more than one process or user at a time requires one of the computer's resources, the resource must be shared between the requesting entities. Thus, some form of resource allocation and scheduling is needed.

Operating systems, which manage the allocation of a computer's resources, share the usage of each resource among requesting entities in accordance with some pre-set scheme. For example, in a "round-robin" scheme the operating system divides usage of a resource by granting each requesting process full use of the resource for a relatively short period of time, and by rapidly switching use of the resource among all consumers. In an alternative scheme, requesting entities are grouped according to their associated priority. Those processes given relatively high priorities receive larger portions or more frequent use of the shared resource than processes assigned lower priorities.

Each of these schemes has disadvantages. For example, transferring use of a resource among numerous consumers in a round-robin scheme can be inefficient because during the time it takes to effect the transfer (commonly termed a "context switch") the resource is not being productively used. The more frequently the resource is transferred, the less time it is actually in use and the lower its overall efficiency. A priority scheme may somewhat alleviate the waste of resource time inherent in context switches by providing for longer use of the resource in between transfers, but will be unfair to those consumers that must wait longer periods of time to use the resource.

The chosen method of sharing a resource among multiple consumers typically affects all system users, whether they interface directly with the operating system or operate within an application environment (e.g., a database management system (DBMS), a word processor, a modeling system). For example, instead of directly accessing the necessary computer resources to manage access to database tables on behalf of numerous users, a database management system typically calls upon the operating system to handle such access. Users within application environments are thus dependent upon the scheduling scheme implemented by the operating system, which may not provide the most efficient access to resources needed by those users. Because the operating system schedules use of all resources among all consumers according to a set scheme, an environment or process that would benefit from a different scheduling scheme suffers. The operating system's method of allocating resources is not flexible enough, and usually cannot be customized, to provide for the optimal sharing of resources among all consumers.

In a large database management system, for example, which may have thousands of processes and jobs running to accomplish various tasks (e.g., retrieving data, storing data, generating a report), a scheduling scheme that attempts to give each job or process equal access to computer resources can be particularly inefficient. With so many processes waiting to access the resources, the time wasted due to context switches becomes excessive. Similarly, attempting to control allocation of a resource among DBMS users and processes according to a priority scheme does not provide very effective control of the resource. The priority scheme merely allows one group of users or processes to be assigned a higher priority than another and thus receive faster or longer use of a resource. This scheme does not provide the ability to guarantee a particular group a minimal amount of a computer resource, or to provide the ability to limit the amount of a computer resource available to a particular group, thus preventing a database administrator from enabling the most effective control of resource allocation within the DBMS.

Relying upon the operating system's method of resource allocation means that the allocation scheme for distributing resources within the computer system often cannot be dynamically altered according to the demands of system users and processes. In addition, the operating system is usually separate from application environments such as database management systems and therefore generally cannot know what, if any, inter-relationships exist between individual database users, processes and resources. Thus, the operating system may switch a first database process out of a processor while the process holds (i.e., has reserved or been assigned) a resource needed by a second database process. If the second process needs the resource in order to execute, then it is effectively blocked from executing until the first process relinquishes the resource, which may not occur until after the first process receives additional processor time. This situation is often termed "deadlock." In a priority-based allocation scheme where the first process mentioned above is at a lower priority than the second process, this may be termed "priority inversion."

As mentioned above, neither a priority-based scheduling scheme nor a round-robin scheme allows resources to be shared in a truly efficient manner. High priority processes are merely guaranteed to receive more of a resource than low priority processes. If processes or groups of processes could be accorded a particular amount of a resource, or if a group of processes could be limited in the amount of a resource the group could use, system administrators would be able to allocate resources with much finer granularity. Further, the scheduling scheme implemented by an operating system is set at the time the operating system is loaded and begins executing. If a system manager or user wishes to implement a different scheduling scheme (whether for all or selected environments and processes), the operating system must be re-initialized or rebooted.

SUMMARY

The present invention provides systems and methods for allocating a computer system resource among a plurality of resource consumers. In accordance with an embodiment of the invention, allocation of the resource is more finely controlled than has previously been possible. Resource consumers in the present embodiment include processes, jobs, and other entities operating within a computer system and requiring use of a system resource. Computer system resources that may be allocated or shared among resource consumers illustratively include a processor, memory, mass storage and communication bandwidth.

In one embodiment of the present invention, a database management system (DBMS) is provided. A resource scheduler within the DBMS allocates computer system resources among various DBMS processes and jobs that require these resources in order to accomplish DBMS users' desired functions. The resource scheduler in this embodiment of the invention allocates system resources among resource consumer groups, including processes and jobs, according to dynamically selectable resource plans (e.g., during operation of the DBMS, the active resource plan can be changed). Resource plans in this embodiment comprise resource allocation methods for allocating system resources between separate resource consumer groups and/or among members of an individual group.

In one embodiment of the invention, resource consumers are grouped into resource consumer groups based on their requirements for the resource, as specified by a database administrator (DBA). For example, in one illustrative plan groups are established for different processing functions (e.g., processing electronic mail or fixing programming errors). In another illustrative plan, resource consumers are grouped according to their mode of execution (e.g., on-line, batch). After constructing resource consumer groups, the DBA combines the groups into one or more resource plans.

In an embodiment, only one plan at a time is active during operation of the DBMS. In an alternate embodiment, multiple resource plans are active at the same time. Each plan can include one or more sub-plans. Each sub-plan includes groups of resource consumers.

In an embodiment, during operation of the DBMS, a group can only be a member of one active plan or sub-plan and is thus allocated system resources only within that plan or sub-plan. In an alternate embodiment, a group can be a member of more than one active plan or sub-plan. Within each plan and sub-plan, system resources are assigned to the participating groups based on a resource allocation method.

In a present embodiment of the invention, a "maximum active sessions" resource allocation method is provided in which system resources are allocated among a plan's groups and sub-plans by imposing limits on the number of active sessions allowable within a group or sub-plan. By adjusting the limits, a DBA is able to increase or decrease the number of active sessions allowable within a group, and thereby increase or decrease the system resources given to individual groups of resource consumers. In this embodiment, each group and sub-plan is assigned a maximum number of sessions that may be active within that group or sub-plan. This maximum number can be infinite, in which case the group or sub-plan will have no plan-imposed restrictions upon the number of active sessions it may have.

Multiple plans can be configured and stored, and the active plan or plans can be changed at any time while the DBMS is running without restarting the operating system or DBMS. In a present embodiment, a plan may include one resource allocation method for allocating system resources between groups (e.g., maximum active sessions) and a separate resource allocation method for allocating system resources among the members of a single group (e.g., round-robin).

When operating conditions change (such as the composition of active DBMS users), a database administrator can activate one or more of the stored plans in place of the currently active plan or plans. For example, the resource scheduler may first operate (e.g., during the business day) according to a plan that partitions system resources among groups of resource consumers according to the maximum active sessions resource allocation method and a first set of session limits. Later, however (e.g., at night), a different plan may be implemented having the same groups but different session limits. Alternatively, the first resource plan may be changed to another plan in which system resources are allocated according to different groups or a different resource allocation method. In either event, the change in resource plan or resource allocation method can be made without restarting the DBMS.

DESCRIPTION OF THE FIGURES

FIGS. 4A–4C depict a resource plan, including a maximum active sessions resource allocation method, having a sub-plan in one embodiment of the invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, the present invention is described predominantly in terms of a database management system including a scheduler for scheduling or allocating a computer system's resources among a plurality of requesting entities. However, the concepts discussed herein are broad enough to provide for the allocation of any computer system resource among a plurality of entities needing the resource, within or without a particular application environment.

Throughout this detailed description, numerous specific details are set forth. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In some instances, components implemented by the present invention are described at an architectural, functional level. Many of the elements may be configured using well-known structures. Additionally, for logic to be included within the system of the present invention, functionality and flow diagrams are described in such a manner that those of ordinary skill in the art will be able to implement the particular methods without undue experimentation. It should also be understood that the techniques of the present invention can be implemented using a variety of technologies. For example, the resource scheduler described herein may be implemented in software running on a computer system, or implemented in hardware utilizing either a combination of microprocessors or other specially designed application specific integrated circuits, programmable logic devices, or various combinations thereof.

Sharing Resources in a Database Management System Environment

In one embodiment of the invention, a database management system (DBMS) is provided for operation on a database server. The DBMS includes a scheduler for allocating computer resources among the various users, processes and jobs interacting with the DBMS environment.

Figure 1:
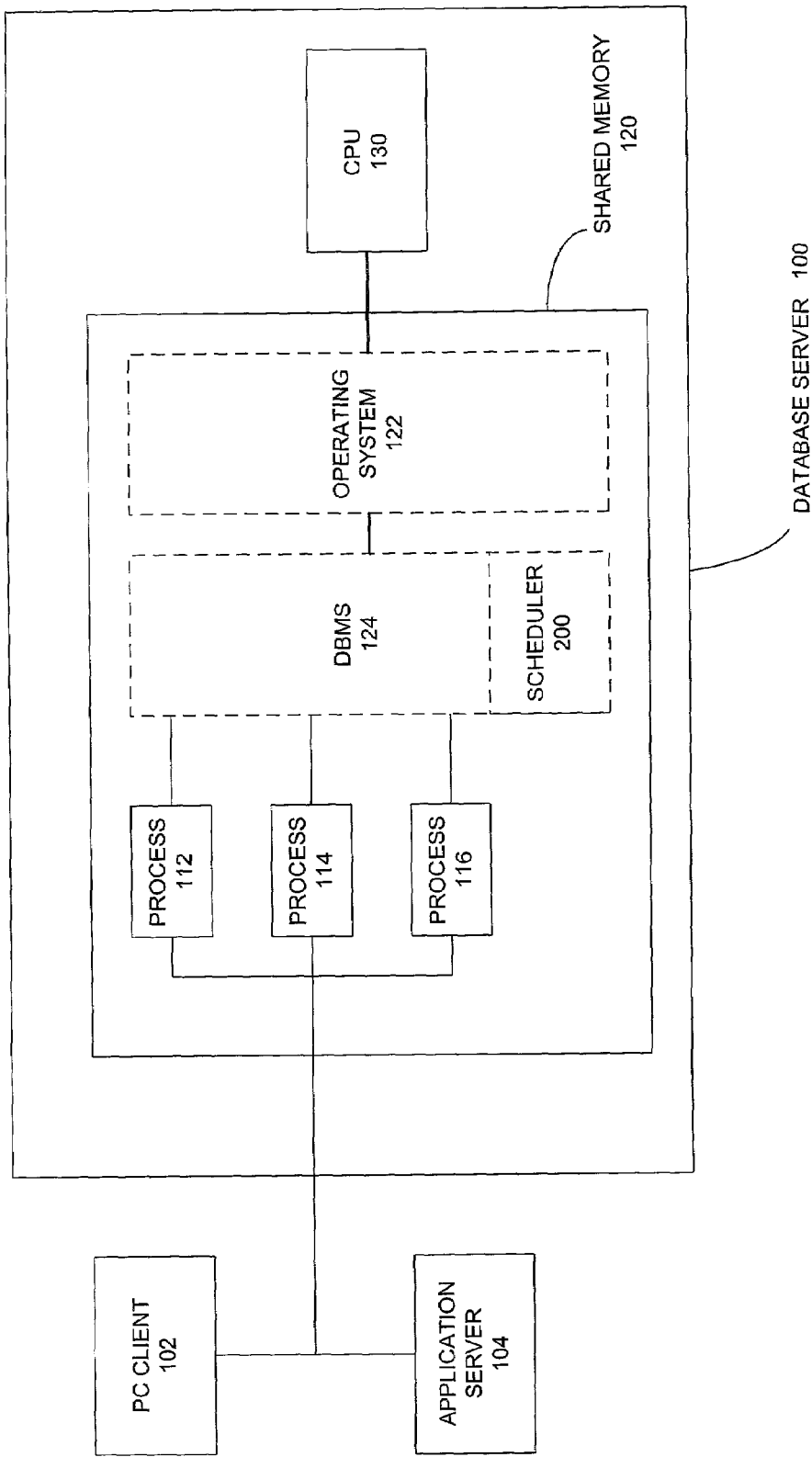
FIG. 1 illustrates a database server on which one embodiment of the invention may be practiced.

FIG. 1 depicts an illustrative database management system operating on database server 100. DBMS software 124 and operating system 122 are resident in shared memory 120, where they are executed by processor (or CPU) 130. DBMS software 124 includes scheduler 200. In an alternative embodiment, scheduler 200 is separate from DBMS software 124.

In the illustrated embodiment, the DBMS serves one or more clients. Illustratively, client 102 is a small computer system, such as a microcomputer, and client 104 is an application server offering the DBMS services of database server 100 to multiple end users. DBMS processes also reside in memory 120 and operate on behalf of end users, clients, a database administrator (DBA), or another process. Three database processes 112, 114 and 116 are illustrated in FIG. 1. One skilled in the art will recognize that server 100 can be configured to operate a wide range of processes numbering from a few into the thousands and that the scope of the invention is not limited by the number or type of processes executed on server 100.

Database processes executing on server 100 share memory 120, which is coupled to processor 130. In an alternative embodiment, server 100 employs multiple processors. In order to maximize the use of processor 130, one or more DBMS processes that are ready to execute (i.e. are "runnable") are illustratively placed in a run queue (not shown in FIG. 1) within memory 120. When an executing process completes execution or otherwise relinquishes control of the processor, a process within the run queue takes over.

In a present embodiment of the invention, DBMS software 124 is Oracle® RDBMS 9i by the Oracle Corporation of Redwood Shores, California and operating system 122 is Solaris, by Sun Microsystems, Inc. of Palo Alto, Calif. DBMS software 124 illustratively includes a portion of operating system-dependent code to interface between operating system 122 and DBMS software 124. In such an embodiment, the majority of the instructions included in DBMS software 124 are identical regardless of the brand or version of operating system 122. The operating system-dependent code, however, is tailored to the specific operating system (e.g., Solaris, Unix, Windows NT).

Operating system 122 manages the database server's resources (e.g., disk space, memory, network bandwidth, and processor 130) at a low level, sharing them among all requesting entities. However, a primary function of database server 100 in the present embodiment is to operate DBMS software 124 and serve the DBMS' clients and users. Therefore, the DBMS environment consumes the vast majority of the server's resources. Thus, although the operating system manages system resources at a low level, most of the system resources are used within the DBMS where they are partitioned among groups of consuming entities by scheduler 200 as described below.

Scheduler 200 is highly flexible and employs an allocation, or scheduling, plan that is dynamically selectable. Multiple resource plans may be configured and stored on the server, and one or more plans may be active at a time. The active plans may be exchanged for other plans during the operation of the DBMS and server. A resource plan partitions system resources among groups of consumers assembled by a DBA or system manager. Resource consumer groups and resource plans are further described below, following the description of an illustrative scheduler.

Description of a Database Scheduler

Figure 2:
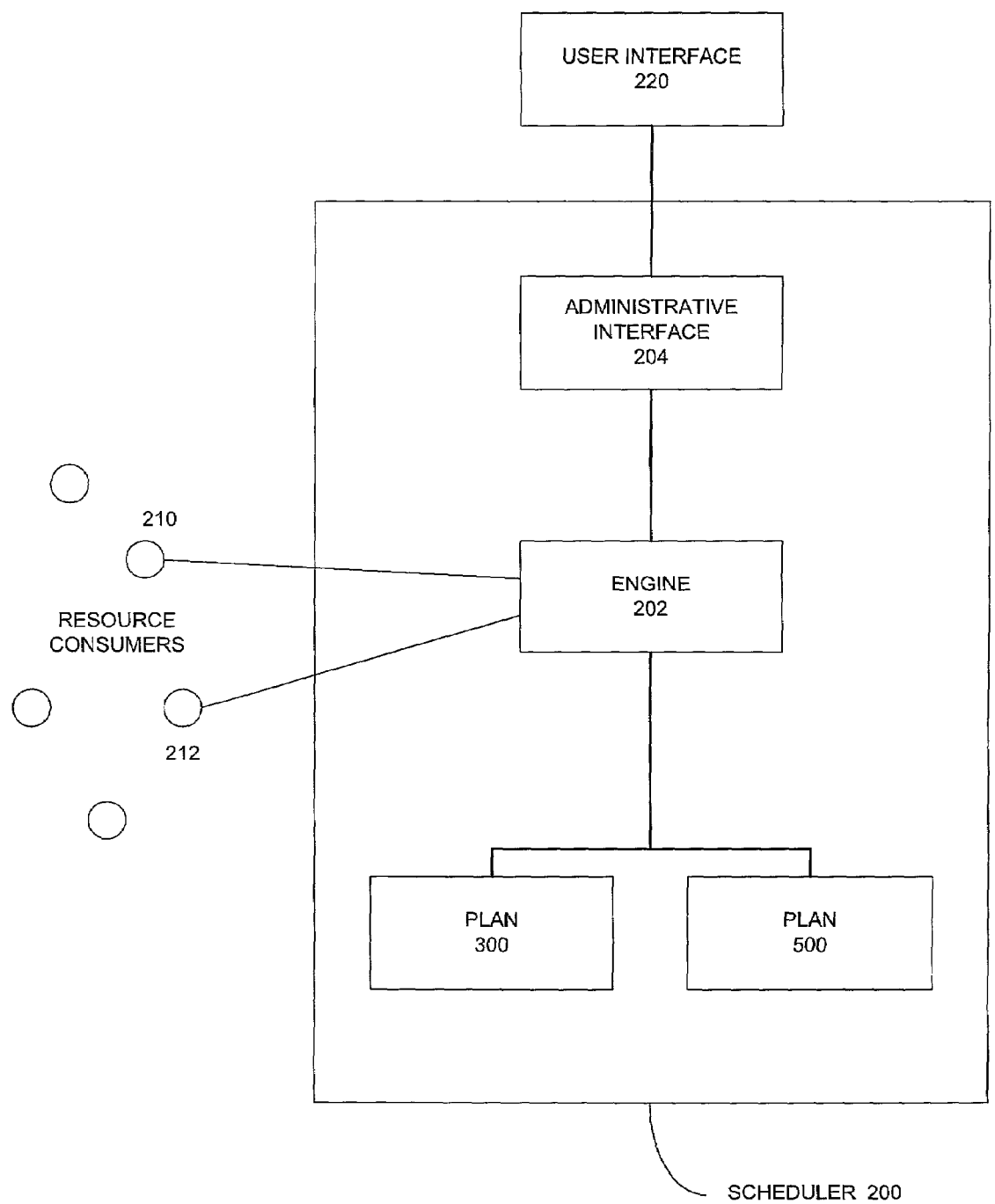
FIG. 2 is a block diagram illustrating a resource scheduler according to one embodiment of the invention.

With reference now to FIG. 2, scheduler 200 is depicted according to one embodiment of the invention. In the illustrated embodiment, the scheduler comprises a portion of DBMS software 124 (from FIG. 1) other than operating system-dependent code. The scheduler 200 is a piece of software that can be executed by any or all running processes on the DBMS. For example, a DBMS process will periodically call into the scheduler 200 to determine whether the process should keep running. If not, the scheduler 200 will chose another process to run.

In this embodiment, scheduler 200 allocates system resources among various entities, herein termed "resource consumers." Resource consumers illustratively include processes and jobs (such as processes 112, 114 and 116 from FIG. 1) needing system resources to execute on behalf of DBMS clients and users. Resource consumers are grouped into "resource consumer groups." In one variation, a database administrator or system manager assigns a resource consumer to a resource consumer group. Scheduler 200 allocates system resources according to a "resource plan", which is a scheme for allocating a resource among a plurality of resource consumer groups and/or sub-plans in accordance with a resource allocation method. A resource plan can contain one or more "resource allocation methods," which are strategies for allocating a resource, and/or one or more "sub-plans", which are schemes for allocating a resource among a plurality of resource consumer groups in accordance with a resource allocation method.

Scheduler 200 includes engine 202, administrative interface 204, and one or more resource plans. Two resource plans 300, 500 are depicted in FIG. 2, although one skilled in the art will recognize that the number of plans configured and stored within scheduler 200 does not limit the scope of the present invention. In an embodiment, only one of plans 300, 500 at a time is implemented (i.e., "active") by scheduler 200 during the operation of the DBMS. A DBA may, however, exchange the active plan for a different one even during operation of the DBMS. In an alternate embodiment, multiple plans are active at the same time.

Administrative interface 204 is coupled to user interface 220, which is external to scheduler 200. User interface 220 and administrative interface 204 are employed by a DBA to configure scheduler 200. Through these interfaces, the DBA can configure (e.g., create, modify and delete) a group of resource consumers or select a resource plan for implementation by scheduler 200. The DBA can also modify resource plans, such as to change the groups within a plan or alter a plan's resource allocation method (described below) for allocating system resources.

In a present embodiment, the DBA also employs user interface 220 and administrative interface 204 to observe the performance of scheduler 200. Illustratively, parameters are stored by scheduler 200 concerning its operation, such as statistics reflecting the actual allocation of system resources, the number of entities requesting system resources, the amount of time that consumers or resource consumer groups must wait to receive system resources, etc.

Resource consumers communicate with scheduler 200 in order to request and receive system resources. Two resource consumers 210, 212 are illustrated in FIG. 2. Illustratively, scheduler 200 keeps a count of the number of consumers that are "runnable," or ready to execute. In accordance with the active resource plan, engine 202 determines which resource consumer group and/or individual consumer is to receive system resources as they become available.

The active plan or plans (i.e., the plan or plans implemented by scheduler 200) can be changed during the operation of the DBMS. In other words, engine 202 can quickly switch from implementing plan 300 to implementing plan 500 without interrupting the operation of the DBMS or server 100. Plans are installed at the time the DBMS is initialized and can be removed, modified and added as necessary. As described below, a plan allocates system resources among groups of resource consumers according to an associated resource allocation method and numerical values associated with each group. One plan may be well suited to efficiently meet the needs of certain types of consumers at certain times (e.g., 110 during the business day when most of the consumers comprise processes representing on-line, interactive, users). A different plan, possibly comprising the same groups but having a different resource allocation method or different numerical values attached to the groups, may be more effective than the first at a different time (e.g., at nighttime, when most of the consumers are batch processes).

Resource Plans

Figure 3:
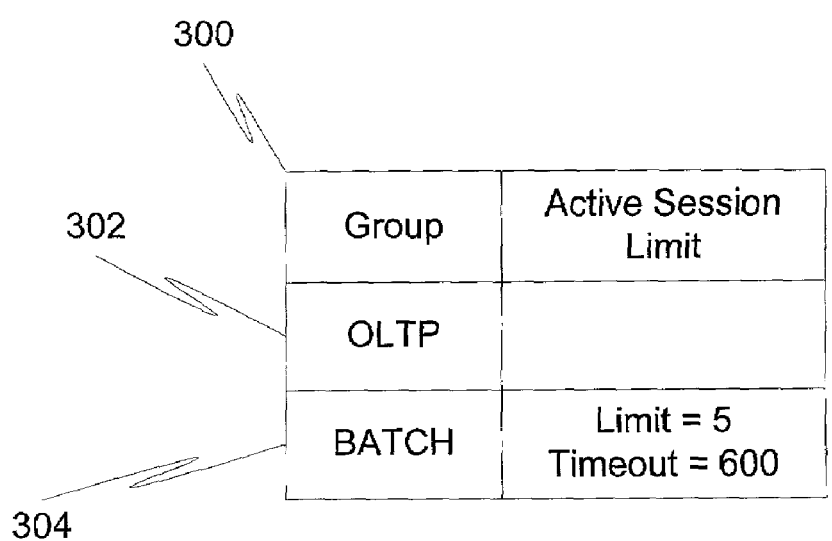
FIG. 3 depicts a resource plan, including a maximum active sessions resource allocation method, for scheduling resources according to one embodiment of the invention.

The following is a description of an illustrative resource plan depicted in FIG. 3. It will be understood that a wide variety of resource plans may be configured in accordance with the present invention. In general, however, a DBA first assembles resource consumers into groups. Illustratively, group assignments are made based upon the consumers' requirements for system resources (e.g., batch vs. on-line users, administrative and maintenance functions vs. data processing). The DBA then assembles one or more groups into a plan. Within a plan, system resources are allocated to groups of consumers according to numerical values associated with each group in the plan. Multiple plans can include the same groups with different numerical values. In addition, a plan may be included in another plan as a sub-plan. In an embodiment, the numerical values are statically computed ahead of time and included in the resource plan. In another embodiment, the numerical values are dynamically calculated while the DBMS is operating. For example, the DBMS of an embodiment measures various system load parameters and dynamically adjusts the numerical values in response to changing system load characteristics.

Within each plan, the DBA specifies an inter-group resource allocation method for partitioning system resources between the groups included in the plan. When a plan is to be implemented by scheduler 200, each group receives system resources according to its associated numerical value and the specified resource allocation method. An intra-group resource allocation method may also be specified for allocating system resources within a group. One advantageous resource allocation method, termed a "maximum active sessions" resource allocation method, is described immediately below. Other methods are possible, such as emphasis, round-robin, strict preemption, priority, etc.

In a present embodiment of the invention plan 300 is a "maximum active sessions" plan. In other words, plan 300 allocates system resources between groups of resource consumers according to a "maximum active sessions" resource allocation method. Specifically, a maximum active sessions plan or resource allocation method divides system resources among groups by establishing limits on the number of sessions that can be active within any given group. When the maximum active sessions resource allocation method is used for inter-group allocation, different groups of resource consumers are given different (or possibly equal) maximum active session limits. Intra-group allocation may use a variety of methods, such as emphasis, round-robin, priority, etc. Thus, in a maximum active sessions plan, individual resource consumers and/or groups of resource consumers are assigned maximum active session values. These values cause the system resources to be partitioned, with groups having higher limits getting more access to resources than groups having lower limits, because the groups with higher limits will be allowed to have more active sessions. This also guarantees that each group will have access to a minimal level of resources.

With reference to FIG. 3, ERP plan 300 is depicted. ERP plan 300 has two groups, on-line transaction processing (OLTP) group 302 and batch (BATCH) group 304. OLTP group 302 does not have a maximum active sessions limit defined for it. Therefore, OLTP group 302 has no plan-imposed limits on the number of concurrently active sessions allowed. It is possible, however, that the DBMS or the underlying operating system may impose some form of limits on the total number of active sessions allowed for the entire DBMS or operating system. Batch group 304 has a maximum active sessions limit of five. Thus there can be no more than five concurrently active sessions within the batch group 304.

An "active session" is defined as a session that is currently part of an active computer system operation, such as a database transaction or query. Once the maximum active sessions limit is reached, all subsequent sessions attempting to become active are queued until other active sessions complete or otherwise become inactive. Once an active session starts running, the scheduler will allow the operation (transaction, query, etc) to complete.

The queuing decision can be addressed in several different ways. When a session becomes active, a slot is allocated for that session. It is possible that a session's unit of work is composed of several statements forming a transaction, or multiple cursors forming a single query operation. Each individual subcomponent of work is represented by a new top call, or process. Not all of these statements or cursors will necessarily be processed at the same time. Thus, it possible that a session could be queued between subcomponents, as one subcomponent finished executing, and another was about to start up. This presents a danger of deadlock, as a second session needs resources being held by a queued process.

In an embodiment, a "large granule pessimistic" queuing strategy is adopted. An active session is charged against the maximum active sessions limit for only the first top call generated for a unit of work (transaction, query, etc.), and a slot is allocated for this session at the beginning and for the entire duration of the operation. This slot is only freed when the unit of work has completed, e.g. when a transaction is committed or when a query has freed all the meta-resources, cursors, locks, memory, etc. that is may be holding. This avoids the deadlock problem because a session would not get queued while holding shared resources since, if it holds shared resources, it is already occupying a slot and is therefore runnable, and runnable sessions do not get queued. Where a parallel operation is performed, the entire parallel operation is counted as one active session, even though the operation may result in many slave sessions being created for the parallel processors.

In an alternate embodiment, a "small granule pessimistic" queuing strategy is used. A slot is allocated every time a subcomponent of work starts, and a slot is freed every time a subcomponent of work is completed. In order to avoid deadlocks, any sessions that hold shared resources are always allowed to run, even if this results in the active sessions limit being exceeded.

In yet another alternate embodiment, a "small granule optimistic" queuing strategy is used. This strategy is similar to the small granule pessimistic strategy discussed above, with a deadlock detection mechanism added in. This detection mechanism detects queued sessions that are blocking currently running sessions, and submits those queued sessions to be run. This strategy avoids deadlocks, yet keeps a tighter limit on the number of running sessions.

Various different queuing methods are also within the scope of an embodiment of the invention. For example, a first-in first-out (FIFO) queue can be used, where the first session at the head of the queue is run before any session queued behind it. Alternatively a shortest estimated execution time queue can be used, where the session estimated to take the least amount of time to run will be executed before longer sessions.

In an embodiment, a timeout value is specified as part of the resource plan. The timeout value indicates how long any session will wait on the queue. If a session waits on the resource consumer group's queue for longer than the specified timeout, the session will abort with an error. For example, the batch group 304 in the ERP plan 300 includes a timeout value of 600 seconds (10 minutes). Thus any batch session which is waiting in the queue for 10 minutes or longer will be aborted with an error.

The ERP plan 300 has been depicted using an absolute number value to define the maximum active session limit. Other embodiments of the invention use other resource allocation methods to define the maximum active session limit. For example, in an alternate embodiment a percentage of a total active sessions limit for the entire resource plan or for the computer system is used, instead of an absolute number. In another alternate embodiment, a dynamically computed value, based on system load measurements or other criteria, is used to define the maximum active session limit for a resource consumer group.

Figure 4A:
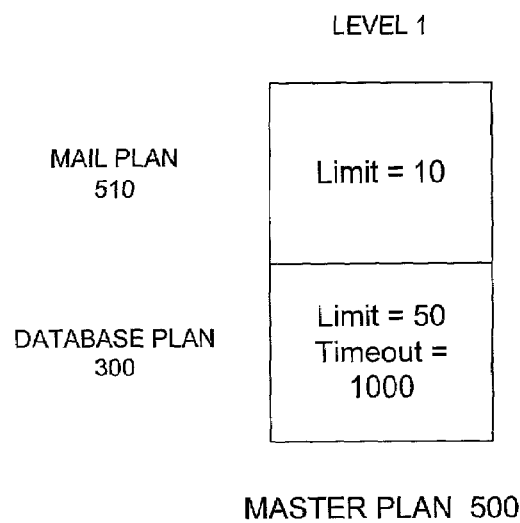
Figure 4B:
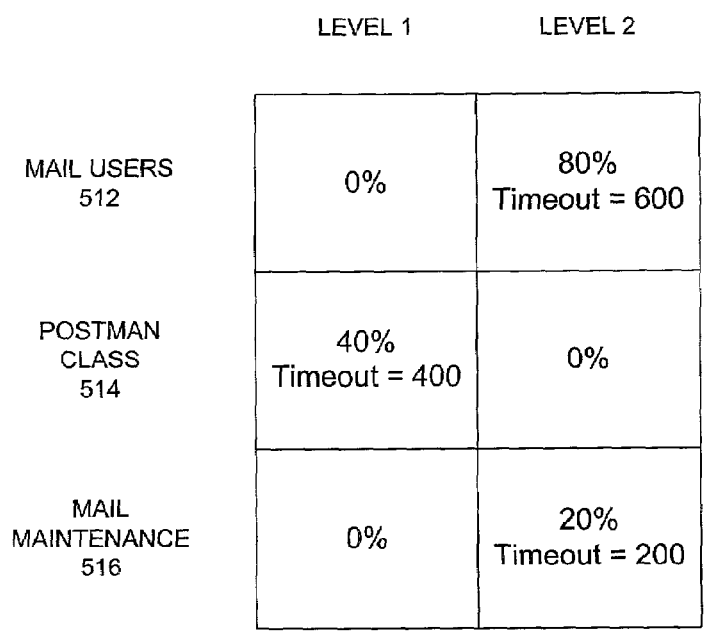

In another embodiment, the resource plan has multiple levels. FIGS. 4A, 4B and 4C depict a plan having two sub-plans, each of which are emphasis plans. In FIG. 4A, MASTER plan 500 is a resource plan in which all resources are divided among the two sub-plans: MAIL plan 510 and DATABASE plan 550. The MAIL plan 510 has a maximum active sessions limit of 10. The DATABASE plan 550 has a maximum active sessions limit of 50.

MAIL plan 510, depicted in FIG. 4B, consists of 2 levels. In Level 1, the Postman group of resource consumers (represented by the numeral 512) is allocated 40% of the maximum active session limit for the MAIL plan 510 while the mail users and mail maintenance groups (represented by the numerals 514 and 516) share the remaining 60% by a ratio of 80 to 20 in Level 2. DATABASE plan 550 is depicted in FIG. 4C.

With reference now to FIG. 4C, DATABASE plan 550 is depicted. DATABASE plan 550 consists of three levels (Level 1, Level 2 and Level 3), represented by the numerals 552, 554 and 556. On-line (or interactive), batch and DBMS maintenance groups are represented by the numerals 560, 562 and 564.

Within DATABASE plan 550, all active session slots available to the DATABASE plan 550 are first allocated in Level 1 according to the percentages associated with each group included in the level. Thus, online and batch consumers receive 60% and 20%, respectively, of the available active session slots. The active session slots not allocated in Level 1 (i.e., 20% of all available slots) are allocated among the groups participating in Level 2 according to their assigned percentages. Thus, online and DBMS maintenance tasks each get 50% of the remaining 20% of the active session slots (i.e., each gets 10% of the total slots). Finally, if active session slots are somehow unallocated after Level 2, they are all allocated to the batch group in Level 3. For example, if a group participating in Level 1 or Level 2 is empty at the time scheduler 200 would have allocated active session slots to the empty group, the active session slots that would have been allocated to the empty group are given to the batch group in Level 3.

As plan 500 demonstrates, several levels may be configured in a plan. If, after the last level, active session slots remain unallocated, they are recursively allocated according to the active plan. Additionally, plan 500 demonstrates that different resource allocation methods can be combined within a plan.

Figure 5:
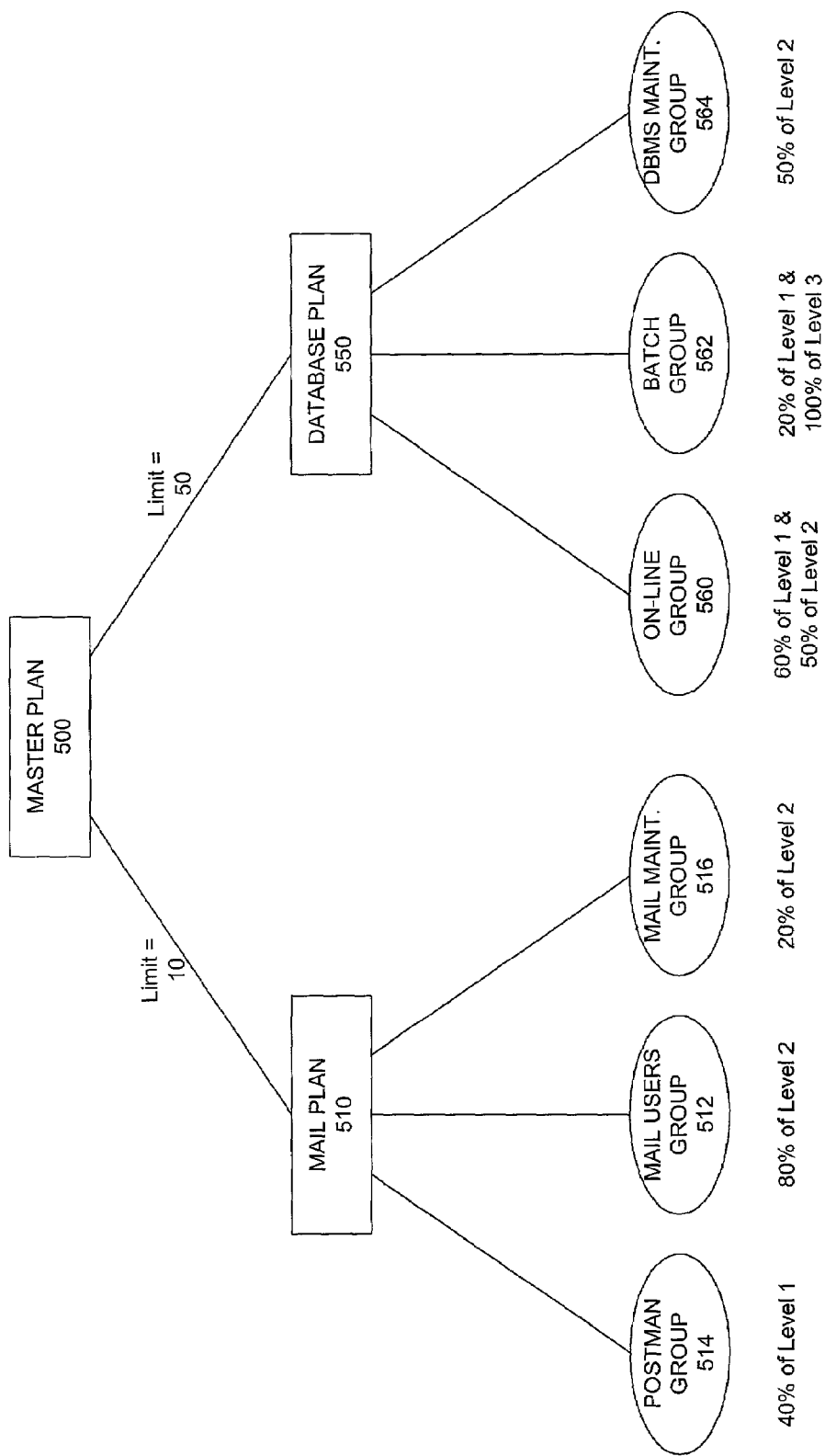
FIG. 5 is a diagram demonstrating the partition of system resources according to the plans of FIGS. 4A–4C according to an embodiment of the invention.

FIG. 5 is a tree-structured diagram demonstrating the division of active session slots according to MASTER plan 500. During the operation of the DBMS, scheduler 200 allocates active session slots to the various groups, 512, 514, 516, 560, 562, 564 according to their corresponding percentages.

Operation of a Scheduler

As stated above, scheduler 200 monitors the need for system resources by resource consumers. To ensure correct allocation of system resources among the consumers according to the chosen resource allocation method, scheduler 200 communicates with the consumers, tracks their status, and allocates system resources according to specified inter-group and intra-group resource allocation methods.

When a new consumer first requests system resources from scheduler 200, thus indicating it is ready to execute, a "virtual thread" is created and associated with the new consumer's group. Virtual threads thus indicate those consumers that are runnable, or waiting to execute.

Figure 6:
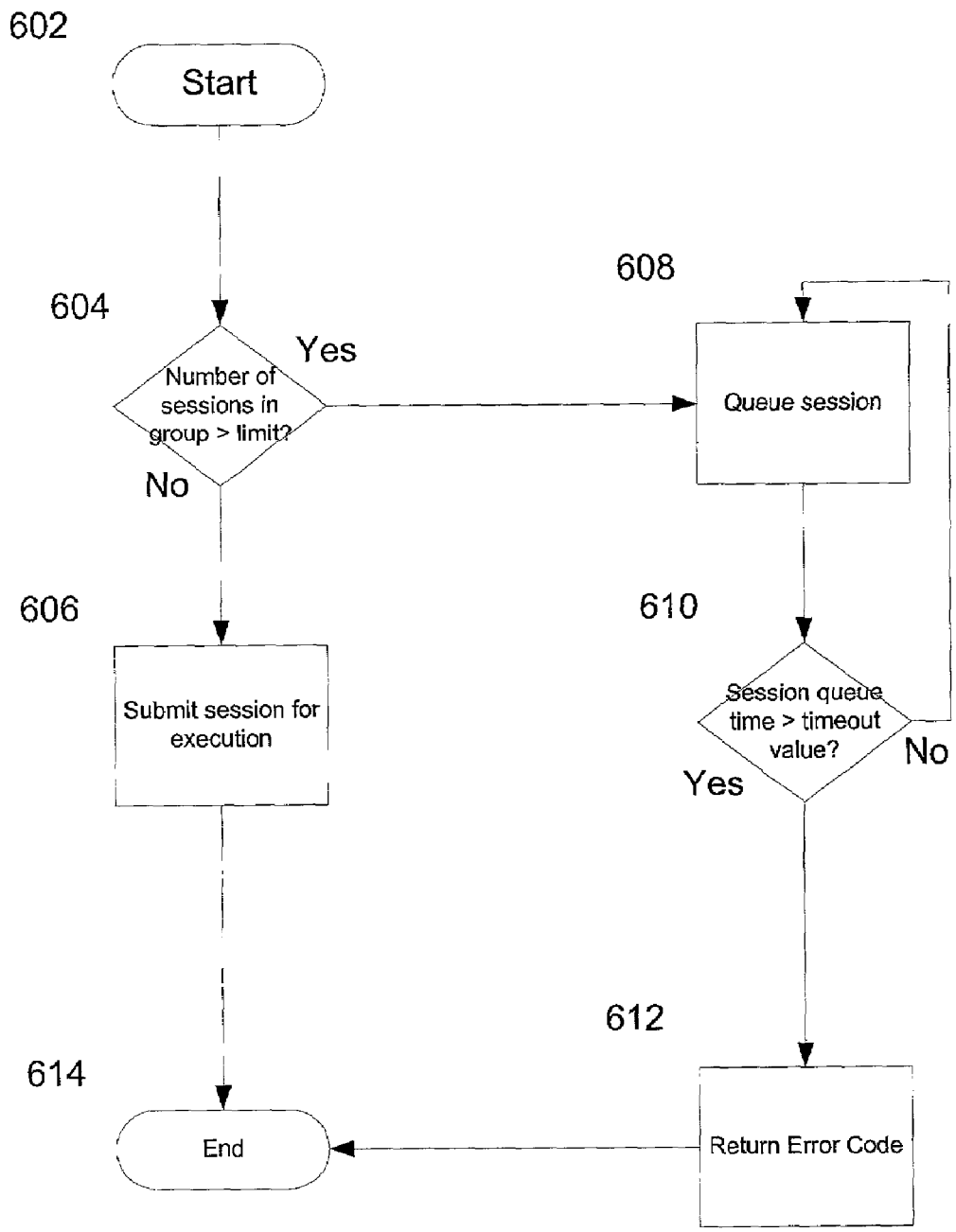
FIG. 6 is a flow chart illustrating a procedure in which resource consumers seeking to become active are managed by a resource scheduler, according to an embodiment of the invention.

Turning to FIG. 6, an illustrative method of allocating system resources using maximum active session limits is discussed. A resource consumer first requests system resources, at step 602. The scheduler receives the request and checks to see which group the resource consumer belongs to. Using the identified group, the scheduler looks up the maximum active session limit criteria associated with the group (e.g. the maximum active sessions limit value or percentage). The scheduler then compares the number of currently active sessions in the indicated group with the maximum active session limit criteria specified for the group, at step 604.

If the number of active sessions allowable for the indicated group has not yet been met, then the scheduler allows the resource consumer to be submitted for execution, at step 606. The method then terminates at step 614.

If the scheduler determines that the maximum number of allowable sessions are already active for the indicated group, then the scheduler queues the incoming resource consumer, at step 608. As sessions within the indicated group go inactive, the queued sessions will be activated according to the queuing methods discussed above.

Periodically, the scheduler polls the queued session, to see how long the session has been in the queue, at step 610. If the session has been in the queue for less than the timeout value, if any, specified for the indicated group, then the queued session remains in the queue. If the queued session has been in the queue for longer than the specified timeout value, then the queued session is aborted, and an error is generated, at step 612. The method then terminates at step 614.

In a present embodiment, resource consumers that are ready to execute are either executing or waiting to execute. Only one consumer at a time is executed by each processor in server 100. If waiting to execute (i.e., runnable), a consumer is either awake or asleep. A limited number of runnable consumers are kept awake, the rest are put to sleep.

When one consumers finishes executing, whether because it has completed its task or because it has used its allotted amount of processor time, or for any other reason, the next consumer to be executed is taken from the set of awake and runnable consumers. Sleeping consumers, however, cannot be executed until after they are awakened. In one embodiment of the invention, besides any consumers that are executing, only one runnable consumer at a time is kept awake. All others are put to sleep. Thus, in this embodiment, once the executing consumer relinquishes control of the processor, only one consumer is in line to execute and scheduler 200 is thus able to closely control the allocation of processor time among resource consumer groups and individual consumers.

In an alternative embodiment, a number of consumers are kept awake and runnable. Thus, less processor time is wasted in waking and putting consumers to sleep. Consumers are put to sleep if the number of runnable consumers that are awake is at or above a high threshold value (e.g., three times the number of processors in server 100). Sleeping consumers are awakened when the number of awake and runnable consumers drops below a low threshold (e.g., the number of processors in server 100).

When an executing consumer relinquishes control of processor 130, the operating system gives control of the processor, in accordance with its own allocation method, to a process that is awake and runnable. If there is only one consumer in such condition, then regardless of which allocation scheme the operating system uses (e.g., round-robin or priority), that consumer will be selected. With multiple processors, scheduler 200 illustratively maintains a separate list of runnable consumers for each processor, although use of a combined list is also within the scope of the invention.

During its execution by processor 130, each consumer periodically communicates with engine 202 to inquire whether it may retain control of the processor. In response, engine 202 either tells it to continue executing or commands the consumer to relinquish control of the processor and sleep. As long as the consumer is allowed to continue execute, it will retain control of the processor and periodically query engine 202.

When the consumer stops executing, operating system 122 gives control to a consumer that is awake and runnable. Thus, in order to maximize the use of each processor, it is preferable to keep at least one consumer awake and runnable for each processor. Therefore, in a present embodiment of the invention in which only one consumer is awake and runnable (but not executing) for each processor, when engine 202 commands the executing consumer to relinquish control of the processor, the engine passes the consumer the identity of a runnable, sleeping, consumer that is to be awakened. In other words, instead of the scheduler taking control of the processor just to awaken a sleeping consumer, the consumer that is giving up control of the processor awakens the new consumer before putting itself to sleep. One skilled in the art will recognize that this method of transfer minimizes the loss of usable processor time due to context switching.

Figure 7:
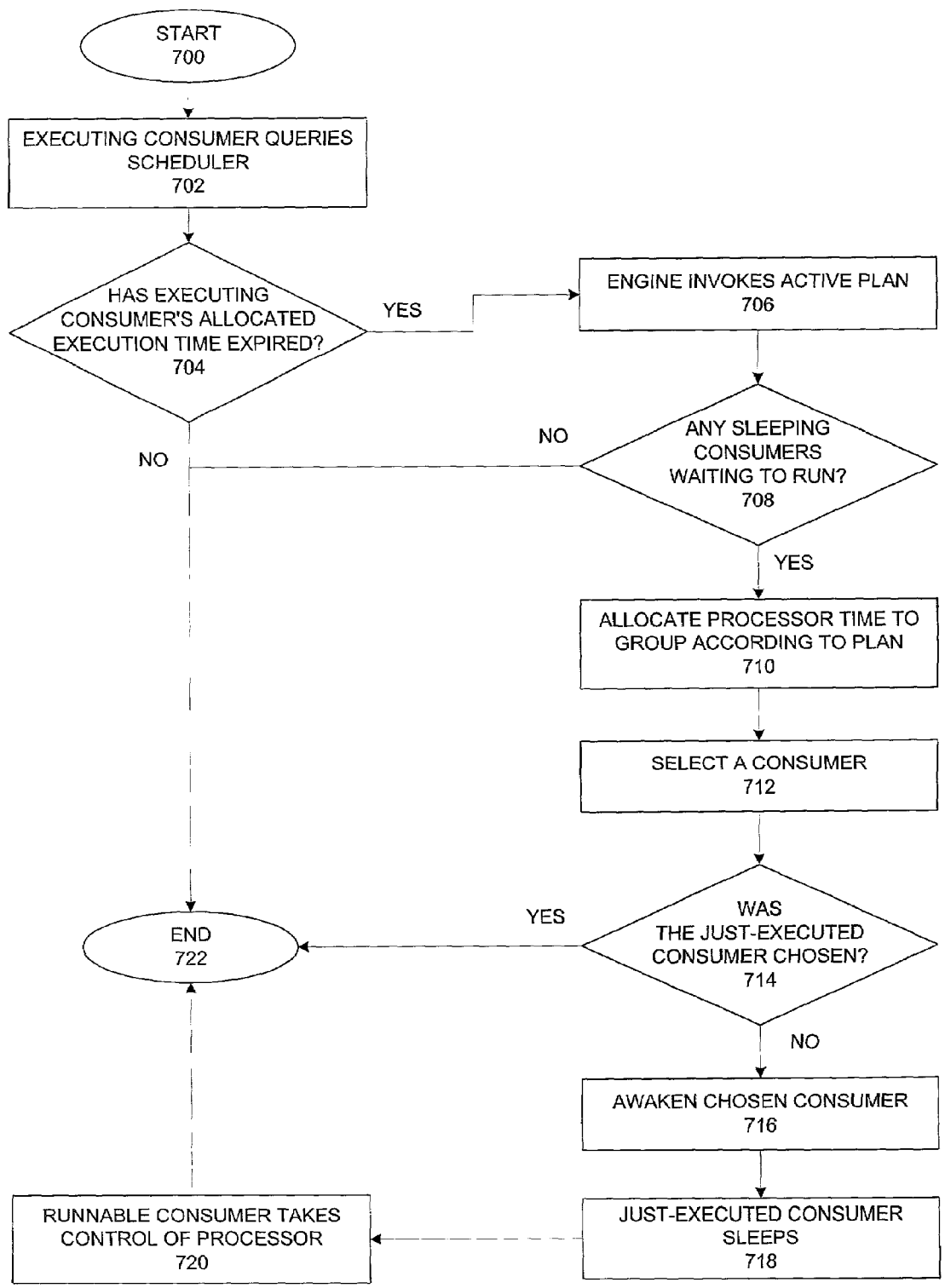
FIG. 7 is a flow chart illustrating a procedure in which resource consumers requiring processor time interact with a resource scheduler to execute in one embodiment of the invention.

FIG. 7 is a flow chart depicting an illustrative method of operating resource scheduler 200 in accordance with an embodiment of the invention. State 700 is a start state. In state 702, scheduler 200 receives a query from resource consumer 210, which is being executed by processor 130, wherein consumer 210 asks whether it should continue executing.

In state 704 the scheduler determines whether consumer 210 has utilized its allocated execution time (e.g., its assigned quanta). If not, consumer 210 continues executing and the illustrated method finishes with end state 722. If, however, consumer 210 has exhausted its allocated execution time, in state 706 the scheduler engine invokes the active plan (e.g., ERP plan 300 from FIG. 3) in order to determine which group of resource consumers should receive processor time.

In state 708 the scheduler determines whether there are any consumers ready or waiting to execute other than consumer 210. In order to make this determination, scheduler 200 maintains a list of virtual threads representing runnable consumers, as described above.

If there are fewer runnable consumers, including consumer 210, than there are processors, then no consumers are waiting for processor time and there is no need to stop executing consumer 210. In such a case, consumer 210 continues to execute and the system proceeds to state 722, an end state. The system also proceeds to state 722 from state 708 if there are no sleeping runnable consumers. This situation arises when there are relatively few consumers awaiting processor time (e.g., the number of awake and runnable consumers is within the allowable range described above).

If, however, a sleeping consumer must be awakened (e.g., the number of awake and runnable consumers has fallen below the low threshold described above), then scheduler 200 must allocate processor time among the groups of consumers that are waiting for processor time. The system thus proceeds to state 710.

In state 710, a group is chosen in accordance with the inter-group resource allocation method in effect for allocating processor time for ERP plan 300 (an example of a method of allocating processor time is described in co-pending U.S. patent application Ser. No. 09/141,666 filed Aug. 28, 1998, entitled "Resource Scheduler" and naming Ann Rhee, Sumanta K. Chatterjee, Juan R. Loaiza and Kesavan Srinivasan as inventors, which application is incorporated herein by reference, in its entirety). In addition, a specific consumer (e.g., consumer 212) is chosen according to the intra-group resource allocation method (e.g., round-robin) associated with the chosen group. In the presently described embodiment of the invention, a probabilistic function is applied to determine which group should receive processor time. In an alternative embodiment, a history is kept to track each consumer (and its group) that is executed in order to verify application of the active plan's specified percentages. For purposes of the illustrated embodiment, the chosen group (i.e., the group that includes consumer 212) is a different group from that which includes consumer 210 (the executing consumer). If the group including consumer 210 is chosen, scheduler 200 illustratively incorporates a bias toward minimizing context switches and thus tends to allow consumer 210 to continue executing and avoid the overhead involved in waking another consumer (unless such bias becomes too unfair to other consumers within the group).

In state 712, an individual consumer (e.g., consumer 212) is selected from within the chosen group and is identified to consumer 210 (the consumer that is to relinquish control of a processor).

In state 714 it is determined whether the selected consumer is the same consumer as that which is finishing execution (i.e., consumer 210). If so, consumer 210 receives an additional quantum and continues executing and the method ends with end state 722. As long as the selected consumer (e.g., consumer 212) is not the same as the one that finished its quanta, the method continues with state 716.

In state 716, consumer 210 awakens consumer 212. Consumer 210 then puts itself to sleep in state 718 to await its next opportunity to execute. In state 720 the operating system recognizes that processor 130 is idle and selects an executable process from those that are runnable. The system then proceeds to state 722, an end state.

System Architecture Overview

Figure 8:
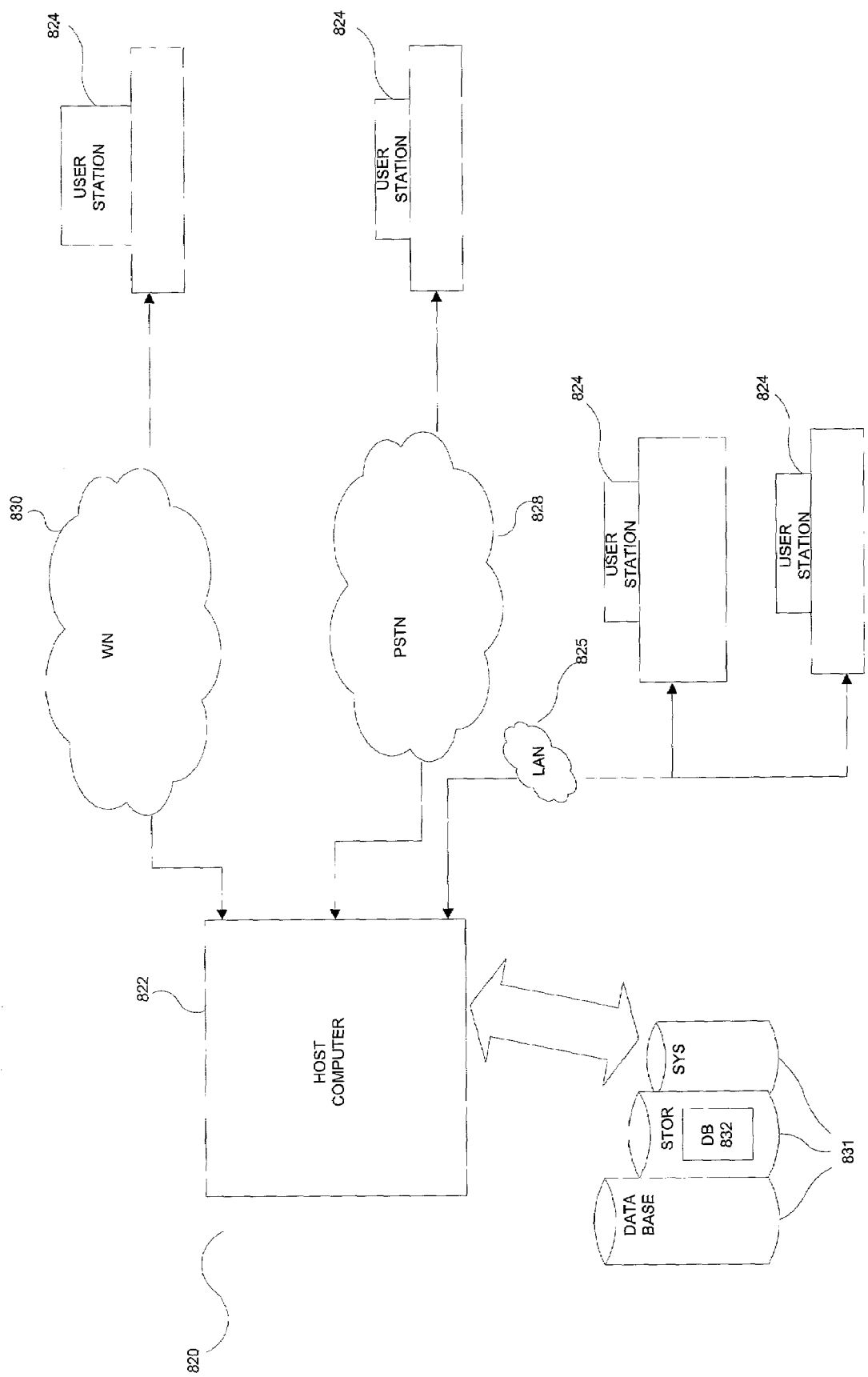
FIG. 8 is a representation of a computer system in accordance with an embodiment of the invention.

Referring to FIG. 8, in an embodiment, a computer system 820 includes a host computer 822 connected to a plurality of individual user stations 824. In an embodiment, the user stations 824 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 824 are connected to the host computer 822 via a local area network ("LAN") 825. Other user stations 824 are remotely connected to the host computer 822 via a public telephone switched network ("PSTN") 828 and/or a wireless network 830.

In an embodiment, the host computer 822 operates in conjunction with a data storage system 831, wherein the data storage system 831 contains a database 832 that is readily accessible by the host computer 822.

In alternative embodiments, the database 832 may be resident on the host computer, stored, e.g., in the host computer's ROM, PROM, EPROM, or any other memory chip, and/or its hard disk. In yet alternative embodiments, the database 832 may be read by the host computer 822 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 822 can access two or 110 more databases 832, stored in a variety of mediums, as previously discussed.

Figure 9:
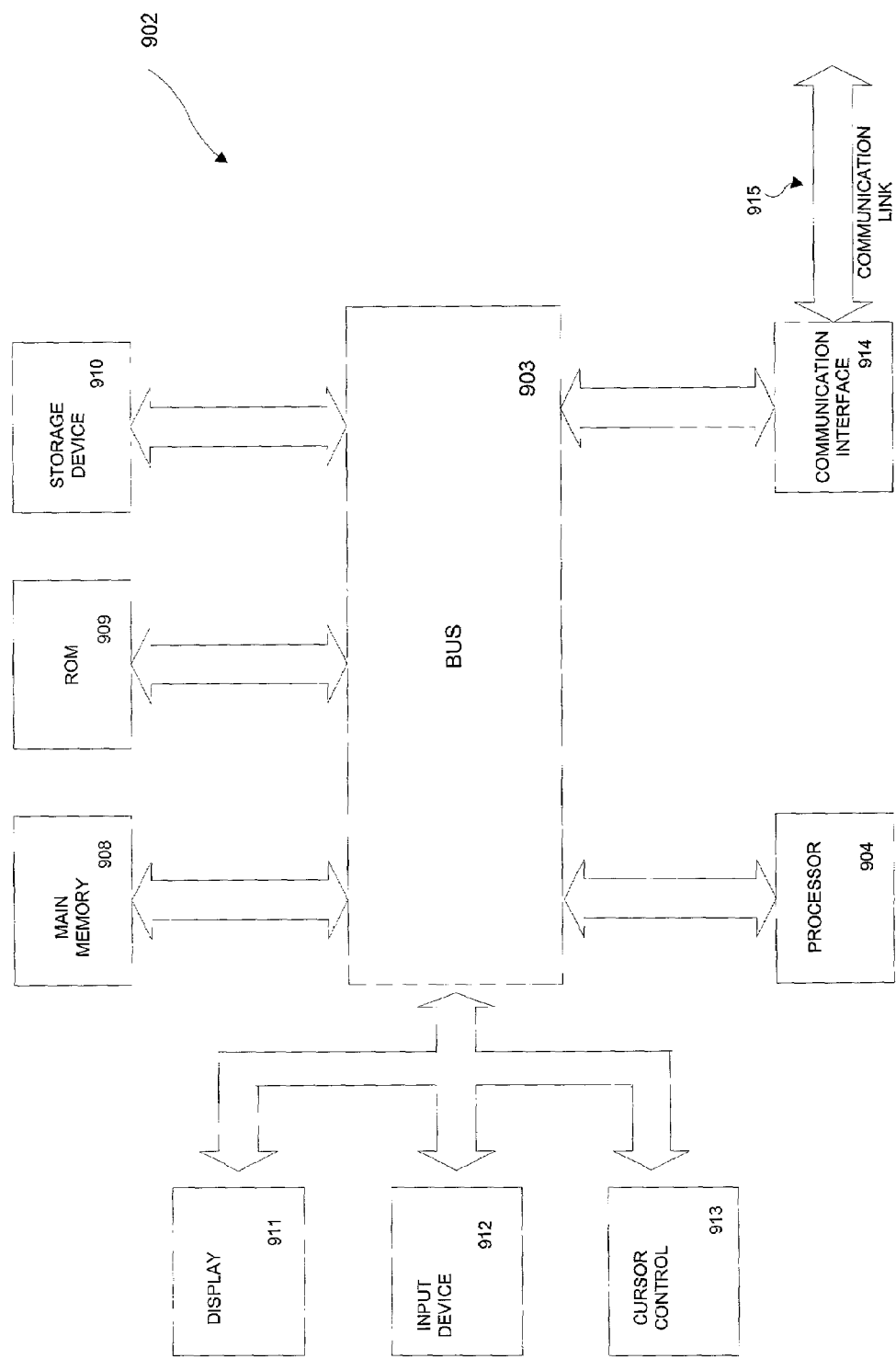
FIG. 9 is a representation of a processing unit in accordance with an embodiment of the invention.

Referring to FIG. 9, in an embodiment, each user station 824 and the host computer 822, each referred to generally as a processing unit, embodies a general architecture 902. A processing unit includes a bus 903 or other communication mechanism for communicating instructions, messages and data, collectively, information, and one or more processors 904 coupled with the bus 903 for processing information. A processing unit also includes a main memory 908, such as a random access memory (RAM) or other dynamic storage device, coupled to the bus 903 for storing dynamic data and instructions to be executed by the processor(s) 904. The main memory 908 also may be used for storing temporary data, i.e., variables, or other intermediate information during execution of instructions by the processor(s) 904.

A processing unit may further include a read only memory (ROM) 909 or other static storage device coupled to the bus 903 for storing static data and instructions for the processor(s) 904. A storage device 910, such as a magnetic disk or optical disk, may also be provided and coupled to the bus 903 for storing data and instructions for the processor(s) 904.

A processing unit may be coupled via the bus 903 to a display device 911, such as, but not limited to, a cathode ray tube (CRT), for displaying information to a user. An input device 912, including alphanumeric and other keys, is coupled to the bus 903 for communicating information and command selections to the processor(s) 904. Another type of user input device may include a cursor control 913, such as, but not limited to, a mouse, a trackball, a fingerpad, or cursor direction keys, for communicating direction information and command selections to the processor(s) 904 and for controlling cursor movement on the display 911.

According to one embodiment of the invention, the individual processing units perform specific operations by their respective processor(s) 904 executing one or more sequences of one or more instructions contained in the main memory 908. Such instructions may be read into the main memory 908 from another computer-usable medium, such as the ROM 909 or the storage device 910. Execution of the sequences of instructions contained in the main memory 908 causes the processor(s) 904 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 904. Such a medium may take many forms, including, but not limited to, non-volatile, volatile and transmission media. Non-volatile media, i.e., media that can retain information in the absence of power, includes the ROM 909. Volatile media, i.e., media that can not retain information in the absence of power, includes the main memory 908. Transmission media includes coaxial cables, copper wire and fiber optics, including the wires that comprise the bus 903. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 904 can retrieve information.

Various forms of computer-usable media may be involved in providing one or more sequences of one or more instructions to the processor(s) 904 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 903 may receive the infrared signals and place the instructions therein on the bus 903. The bus 903 may carry the instructions to the main memory 908, from which the processor(s) 904 thereafter retrieves and executes the instructions. The instructions received by the main memory 908 may optionally be stored on the storage device 910, either before or after their execution by the processor(s) 904.

Each processing unit may also include a communication interface 914 coupled to the bus 903. The communication interface 914 provides two-way communication between the respective user stations 824 and the host computer 822. The communication interface 914 of a respective processing unit transmits and receives electrical, electromagnetic or optical signals that include data streams representing various types of information, including instructions, messages and data.

A communication link 915 links a respective user station 824 and a host computer 822. The communication link 915 may be a LAN 825, in which case the communication interface 914 may be a LAN card. Alternatively, the communication link 915 may be a PSTN 828, in which case the communication interface 914 may be an integrated services digital network (ISDN) card or a modem. Also, as a further alternative, the communication link 915 may be a wireless network 830.

A processing unit may transmit and receive messages, data, and instructions, including program, i.e., application, code, through its respective communication link 915 and communication interface 914. Received program code may be executed by the respective processor(s) 904 as it is received, and/or stored in the storage device 910, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

What is claimed is:

1. A computer-implemented method of allocating a resource in a computer system, comprising:

identifying a plurality of resource consumer groups among which the resource is to be allocated, each of the plurality of resource consumer groups comprising one or more resource consumers grouped therein for a purpose of allowing the one or more resource consumers to receive resource allocated to a corresponding one of the each of the plurality of resource consumer groups;

providing a resource plan specifying an allocation of the resource among the plurality of resource consumer groups;

associating a weight for allocating the resource with at least one of the plurality of resource consumer groups; and allocating the resource among the plurality of resource consumer groups according to the resource plan, using the weight associated with the at least one of the plurality of resource consumer groups;

wherein the weight represents a limitation on a number of sessions that are allowed to be active within the at least one of the plurality of resource consumer groups;

wherein one of a first resource consumer group and a second resource consumer group has a higher limit, another of the first and second resource consumer groups has a lower limit; and wherein the first consumer group has access to a greater portion of the resource than the second resource consumer group.

2. The method of claim 1, further comprising:

associating an intra-group resource allocation method with each of the plurality of resource consumer groups, the intra-group resource allocation method specifying a method of allocating the resource among the consumers in the resource consumer group; and allocating the resource among the resource consumer groups included in one of the plurality of resource consumer groups according to the associated intra-group resource allocation method.

3. The method of claim 2, wherein the intra-group resource allocation method is one of a set of resource allocation methods including: first-come first-served, round-robin, priority, and emphasis.

4. The method of claim 1, wherein the limitation is an absolute number.

5. The method of claim 1, wherein the limitation is a percentage.

6. The method of claim 1, wherein the limitation is a dynamically calculated value, based upon system load measurements.

7. The method of claim 1, further comprising queuing a session where the session exceeds a maximum allowable sessions limit.

8. The method of claim 1, wherein providing the resource plan comprises constructing a new resource plan.

9. The method of claim 1, wherein providing the resource plan comprises activating an existing resource plan.

10. The method of claim 9, further comprising de-activating an active resource plan.

11. The method of claim 1, wherein allocating the resource further comprises applying a maximum active session resource allocation method to allocate the resource by limiting a number of active sessions allowed in one or more resource consumer groups.

12. The method of claim 11, further comprising queuing a session where the session exceeds the maximum allowable sessions limit.

13. The method of claim 1, wherein the resource plan comprises at least one sub-plan.

14. The method of claim 1, wherein the resource plan comprises a plurality of levels.

15. The method of claim 1, wherein each of the plurality of resource consumer groups comprises a plurality of resource consumers.

16. A computer program product that includes a tangible medium useable by a processor, the medium comprising a sequence of instructions which, when executed by said processor, causes said processor to execute a method of allocating a resource in a computer system, the method comprising:
    identifying a plurality of resource consumer groups among which the resource is to be allocated, each of the plurality of resource consumer groups comprising one or more resource consumers grouped therein for a purpose of allowing the one or more resource consumers to receive resource allocated to a corresponding one of the each of the plurality of resource consumer group;
    providing a resource plan specifying an allocation of the resource among the plurality of resource consumer groups;
    associating a weight for allocating the resource with at least one of the plurality of resource consumer groups; and
    allocating the resource among the plurality of resource consumer groups according to the resource plan, using the weight associated with the at least one of the plurality of resource consumer groups;
    wherein the weight represents a limitation on a number of sessions that are allowed to be active within the at least one of the plurality of resource consumer groups;
    wherein one of a first resource consumer group and a second resource consumer group has a higher limit, another of the first and second resource consumer groups has a lower limit; and
    wherein the first consumer group has access to a greater portion of the resource than the second resource consumer group.

17. The computer program product of claim 16, further comprising:
    associating an intra-group resource allocation method with each of the plurality of resource consumer groups, the intra-group resource allocation method specifying a computer program product of allocating the resource among the consumers in the resource consumer group; and
    allocating the resource among the resource consumer groups included in one of the plurality of resource consumer groups according to the associated intra-group resource allocation method.

18. The computer program product of claim 17, wherein the intra-group resource allocation method is one of a set of resource allocation methods including: first-come first-served, round-robin, priority, and emphasis.

19. The computer program product of claim 16, wherein the limitation is an absolute number.

20. The computer program product of claim 16, wherein the limitation is a percentage.

21. The computer program product of claim 16, wherein the limitation is a dynamically calculated value, based upon system load measurements.

22. The computer program product of claim 16, further comprising queuing a session where the session exceeds the maximum allowable sessions limit.

23. The computer program product of claim 16, wherein providing the resource plan comprises constructing a new resource plan.

24. The computer program product of claim 16, wherein providing the resource plan comprises activating an existing resource plan.

25. The computer program product of claim 24, further comprising de-activating an active resource plan.

26. The computer program product of claim 16, wherein allocating the resource further comprises applying a maximum active session resource allocation method to allocate the resource by limiting a number of active sessions allowed in one or more resource consumer groups.

27. The computer program product of claim 26, further comprising queuing a session where the session exceeds the maximum allowable sessions limit.

28. The computer program product of claim 16, wherein the resource plan comprises at least one sub-plan.

29. The computer program product of claim 16, wherein the resource plan comprises a plurality of levels.

30. The computer program product of claim 16, wherein each of the plurality of resource consumer groups comprises a plurality of resource consumers.

31. A system having a processor for allocating a resource in a computer system, comprising:
    a resource plan, the resource plan identifying a plurality of resource consumer groups among which the resource is to be allocated, each of the plurality of resource consumer groups comprising one or more resource consumers grouped therein for the purpose of allowing the one or more resource consumers to receive resource allocated to a corresponding one of the each of the plurality of resource consumer groups, specifying an allocation of the resource among the plurality of resource consumer groups, and associating a weight for allocating the resource with at least one of the plurality of resource consumer groups; and a resource allocation module for allocating the resource among the plurality of resource consumer groups according to the resource plan, using the weight associated with the at least one of resource consumer groups;

wherein the weight represents a limitation on a number of sessions that are allowed to be active within the at least one of the plurality of resource consumer groups;

wherein one of a first resource consumer group and a second resource consumer group has a higher limit, another of the first and second resource consumer groups has a lower limit; and wherein the first consumer group has access to a greater portion of the resource than the second resource consumer group.

32. The system of claim 31, wherein the resource plan further comprises associating an intra-group resource allocation method with each of the plurality of resource consumer groups, the intra-group resource allocation method specifying a method of allocating the resource among the consumers in the resource consumer group, and allocating the resource among the resource consumer groups included in one of the plurality of resource consumer groups according to the associated intra-group allocation method.

33. The system of claim 32, wherein the intra-group resource allocation method is one of a set of resource allocation methods including: first-come first-served, round-robin, priority, and emphasis.

34. The system of claim 31, wherein the limitation is an absolute number.

35. The system of claim 31, wherein the limitation is a percentage.

36. The system of claim 31, wherein the limitation is a dynamically calculated value, based upon system load measurements.

37. The system of claim 31, further comprising a session queuing module for queuing a session where the session exceeds a maximum allowable sessions limit.

38. The system of claim 31, wherein the resource plan comprises a newly-constructed resource plan.

39. The system of claim 31, wherein the resource plan comprises a newly-activated existing resource plan.

40. The system of claim 31, wherein allocating the resource further comprises applying a maximum active session resource allocation method to allocate the resource by limiting a number of active sessions allowed in one or more resource consumer groups.

41. The system of claim 40, further comprising a session queuing module for queuing a session where the session exceeds the maximum allowable sessions limit.

42. The system of claim 31, wherein the resource plan comprises at least one sub-plan.

43. The system of claim 31, wherein the resource plan comprises a plurality of levels.

44. The system of claim 31, wherein each of the plurality of resource consumer groups comprises a plurality of resource consumers.

* * * * *